(12) United States Patent
Takada et al.

(10) Patent No.: US 11,401,169 B2
(45) Date of Patent: Aug. 2, 2022

(54) ALUMINA PARTICLE

(71) Applicant: DIC Corporation, Tokyo (JP)

(72) Inventors: Shingo Takada, Chiba (JP); Kazuo Itoya, Chiba (JP); Jian-Jun Yuan, Chiba (JP); Takayuki Kanematsu, Chiba (JP); Masamichi Hayashi, Chiba (JP); Fumihiko Maekawa, Chiba (JP); Yoshiyuki Sano, Chiba (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/042,899

(22) PCT Filed: Apr. 2, 2019

(86) PCT No.: PCT/JP2019/014584
§ 371 (c)(1),
(2) Date: Sep. 28, 2020

(87) PCT Pub. No.: WO2019/194158
PCT Pub. Date: Oct. 10, 2019

(65) Prior Publication Data
US 2021/0053836 A1    Feb. 25, 2021

(30) Foreign Application Priority Data

Apr. 6, 2018    (JP) .............................. JP2018-073986

(51) Int. Cl.
*C01F 7/02*       (2022.01)
*C01B 33/26*     (2006.01)

(52) U.S. Cl.
CPC .............. *C01F 7/02* (2013.01); *C01B 33/26* (2013.01); *C01P 2004/45* (2013.01);
(Continued)

(58) Field of Classification Search
None
See application file for complete search history.

(56) References Cited

U.S. PATENT DOCUMENTS

2012/0172608 A1* 7/2012 Li ........................ B01J 35/1038
549/536
2013/0183527 A1   7/2013 Bastida et al.
(Continued)

FOREIGN PATENT DOCUMENTS

JP       S59-203774      11/1984
JP       H07-207066      8/1995
(Continued)

OTHER PUBLICATIONS

English abstractor Kinoshita et al. (JP 2016/028993 (Year: 2016).*
(Continued)

*Primary Examiner* — Ronak C Patel
(74) *Attorney, Agent, or Firm* — JCIPRNET

(57) ABSTRACT

The present invention provides alumina particles having a fixed card-house structure formed of three or more flat plate-like alumina particles and having an average particle diameter of 3 to 1000 μm. Also, there is provided alumina particles having an average particle diameter of 3 to 1000 μm and having a fixed card-house structure in which the three or more flat plate-like alumina are aggregated to be crossed each other at two or more plurality of positions, and the plane directions of the flat plates crossed each other are in a state of disordered arrangement.

7 Claims, 2 Drawing Sheets

(52) U.S. Cl.
CPC ...... *C01P 2004/50* (2013.01); *C01P 2004/54* (2013.01); *C01P 2004/61* (2013.01); *C01P 2006/90* (2013.01)

(56) References Cited

U.S. PATENT DOCUMENTS

2015/0239746 A1* 8/2015 Yuan .................. C01F 7/442
　　　　　　　　　　　　　　　　　　428/402
2017/0166454 A1* 6/2017 Watanabe ................ C30B 1/02

FOREIGN PATENT DOCUMENTS

| JP | 2014-028716 | | 2/2014 |
|---|---|---|---|
| WO | WO 2016/024624 | * | 2/2016 |
| WO | 2016084723 | | 6/2016 |

OTHER PUBLICATIONS

English abstractor Futaki et al. JP 02229713 (Year: 1990).*
English abstractor Umezaki et al. JP 2009/035430 (Year: 2009).*
"International Search Report (Form PCT/ISA/210) of PCT/JP2019/014584", with English translation, dated Jul. 9, 2019, pp. 1-4.
Honda et al., "Fabirication and thermal conductivity of highly porous alumina body from platelets with yeast fungi as a pore froming agent", Ceramics International, vol. 42, Issue 12, Jun. 2016, pp. 13882-13887.
Hashimoto S et al., "Synthesis and mechanical properties of porous alumina from anisotropic alumina particles", Journal of the European Ceramic Society, vol. 30, Issue 3, Oct. 2010, pp. 635-639.
"Search Report of Europe Counterpart Application", dated Dec. 21, 2021, pp. 1-7.

* cited by examiner

ALUMINA PARTICLE

CROSS-REFERENCE TO RELATED APPLICATION

This application is a 371 application of the International PCT application serial no. PCT/JP2019/014584, filed on Apr. 2, 2019, which claims the priority benefit of Japan Patent Application No. 2018-073986, filed on Apr. 6, 2018. The entirety of each of the abovementioned patent applications is hereby incorporated by reference herein and made a part of this specification.

TECHNICAL FIELD

The present invention relates to novel alumina particles and particularly to alumina particles having a card-house structure.

BACKGROUND ART

Examples of known inorganic fillers include various ones such as boron nitride, alumina, and the like. These are properly used according to purpose and use, and there is demand for high expectation of alumina as compared with boron nitride and the like because of the excellent technical advantages such as high hardness, excellent mechanical strength, high maximum working temperature in an oxidation atmosphere, etc. and lower cost.

There are known alumina materials having various structures such as a granular shape, a needle shape, a flat plate-like shape, and the like, depending on production methods. In general, with increasing aspect ratio, plate-like alumina particles cause a decrease in powder fluidity associated with increases in surface area and bulk density, thereby causing a practical problem.

In Patent Literature 1, twinned alumina particles known as alumina having a characteristic shape include two flat plate-like alumina particles, which are grown to be crossed each other in an intrusion manner, and have a particle diameter of 0.5 to 10 μm.

In addition, particles known in Patent Literature 2 include fine particles of whisker-like alumina composite oxide such as boehmite or the like, which are aggregated in a flat plate form, the flat plate-like aggregate of fine particles of crystalline alumina composite oxide forming a card-house structure. The flat plate-like aggregate of crystalline alumina composite oxide fine particles is characterized in that the whisker-like alumina composite oxide fine particles have an average length of 2 to 100 nm and an average diameter within a range of 1 to 20 nm, and the aggregate of composite oxide fine particles has an average particle diameter of 30 to 300 nm and an average thickness within a range of 2 to 50 nm. That is, the particles having the card-house structure formed of the fine particle aggregate are themselves alumina composite fine particles of less than the micron order.

CITATION LIST

Patent Literature

PTL 1: Japanese Unexamined Patent Application Publication No. 7-207066
PTL 2: Japanese Unexamined Patent Application Publication No. 2014-28716

SUMMARY OF INVENTION

Technical Problem

Patent Literature 1 describes that it is possible to improve the strength and flame retardancy of plastic and rubber by imparting abrasion resistance thereto, and to increase surface friction coefficient and provide a polymer compound having excellent transparency. However, there is no knowledge that the twinned alumina particles show excellent fluidity as a powder.

Patent Literature 2 also shows no knowledge that the particles having the card-house structure formed of the composite oxide fine particle aggregate have excellent fluidity as a powder. In addition, for example, when added as a filler to a binder or a solvent, the particles not only may decrease workability associated with extreme decrease in slurry viscosity but also may be made disadvantageous in efficiently forming a conductive path with increases in interfaces and thus may impair the original function of alumina having excellent thermal conductivity.

Solution to Problem

In consideration of the situation described above, as a result of earnest research for producing alumina particles having more excellent fluidity, the inventors found that the fluidity of alumina particles can be significantly improved by using alumina particles having a characteristic shape having been unknown so far, not the alumina particles described above, leading to the completion of the present invention.

Advantageous Effects of Invention

Alumina particles of the present invention are alumina particles having a fixed card-house structure formed of three or more flat plate-like alumina particles and having an average particle diameter of 3 to 1000 μm, and thus exhibit the particularly remarkable technical effect of providing alumina having more excellent fluidity.

DESCRIPTION OF EMBODIMENTS

<Lumina Particles Having Card-House Structure>

Alumina particles of the present invention are characterized in that the constituent particles have: 1) a fixed card-house structure formed of three or more flat plate-like alumina particles, and 2) an average particle diameter of 3 to 1000 μm. Hereinafter, the alumina particles having the fixed card-house structure formed of three or more flat plate-like alumina particles and having an average particle diameter of 3 to 1000 μm may be simply abbreviated as "alumina particles". In the present invention, the "flat plate shape" represents a three-dimensional hexahedron plate shape (quadrangular plate shape) in which the shape of a two-dimensional projection plane is a typical quadrangle having four corners, or a shape in which the shape of a two-dimensional projection plane is a polygon having five or more corners (the latter may be referred to as a "polygonal plate shape" hereinafter).

Figure 2:
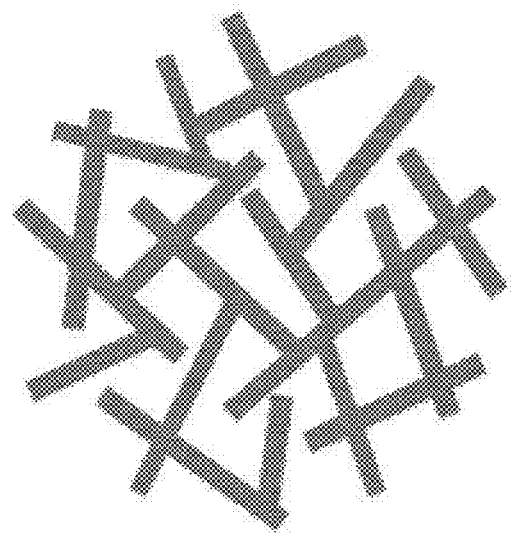
FIG. 2 is a schematic drawing of alumina particles having a fixed card-house structure formed of three or more flat plate-like alumina particles.

The form of the alumina particles can be confirmed by a scanning electron microscope (SEM). The "card-house structure" represents, for example, a structure in which plate-like particles are complicatedly arranged without being oriented. In the present invention, the "card-house structure" represents a fixed structure formed of three or more flat plate-like particles, and more specifically represents a state where two or more flat plate-like particles are aggregated to be crossed each other at two or more plurality of positions and the planar directions of flat plates crossed each other are disorderly arranged (refer to FIG. 2 to FIG. 4). The crossing positions may be any positions of the flat plate-like alumina. The state of disordered arrangement represents a state where the crossing directions of planes is not limited in any one of the X direction, the Y direction, and the Z direction, and the crossing angle of planes may be any angle. Details of the "flat plate-like alumina" are described in detail later.

In the case using as a filler (filler), the number of plates per alumina particle is, for example, 3 to 10000, preferably 10 to 5000, and particularly preferably 15 to 3000 in view of performance and easy production, depending on the average particle diameter of required alumina particles.

The crossing of flat plate-like alumina particles is exhibited by some interaction, for example, fixing and aggregation of three or more flat plate-like alumina particles in the process of crystal formation during a fixing step. As a result, it may be seen as an intrusion form. The flat plate-like alumina particles are strongly fixed to each other, thereby increasing the strength of the card-house structure.

The "crossing" represents that two or more planes are crossed each other at a position, and the crossing position, diameter, area, etc. are not limited. In addition, the number of directions of planes with the crossing position as a starting point may be three or four or more.

The plane of the flat plate-like alumina itself contained in the card-house structure has a long diameter, short diameter, and thickness of any size. In addition, flat plate-like alumina with a plurality of sizes may be used.

As described above, the "flat plate-like alumina" may be quadrangular plate-like alumina or polygonal plate-like alumina. Only one or both of the quadrangular plate-like alumina and the polygonal plate-like alumina may be present in a single alumina particle, and the ratio between the both is not limited.

Figure 1:
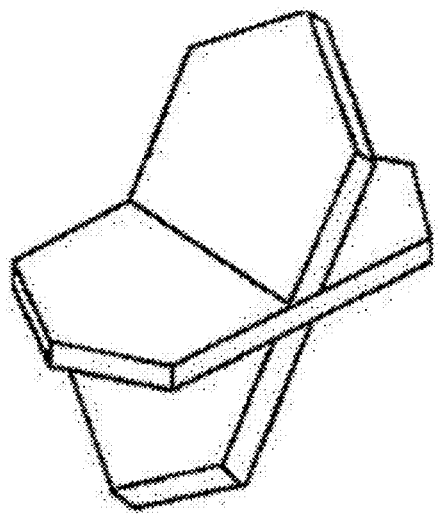
FIG. 1 is a schematic drawing of twinned alumina particles.

Beside the card-house structure, the alumina particles may contain two flat plate-like alumina particles crossed in a substantially X-shaped (may be referred to as "twinned alumina particles", refer to FIG. 1), a substantially T-shape, a substantially L-shape, or the like, and flat plate-like alumina including one plate in any desired state within a range in which the fluidity improving effect as the object of the present invention is not impaired. Of course, these alumina particles are preferably contained at a lower content in order to provide excellent fluidity, and the content ratio on weight basis of the particles having the fixed card-house structure formed of three or more flat plate-like alumina particles is preferably 80% or more and more preferably 90% or more. The content ratio of twinned or one-plate flat plate-like alumina can be easily adjusted by a general classification operation such as sieve classification, air classification, or the like.

The alumina particles of the present invention have very high crushing strength because of the characteristic structure thereof and are thus not easily crushed even by applying external stress. Therefore, when mixed with a binder or a solvent, fluidity failure based on the anisotropy of alumina particles themselves hardly occurs. Therefore, the function originally possessed by alumina particles can be sufficiently brought out, and even if the alumina particles are mixed with plate-like alumina particles and used, the plate-like alumina particles, which are likely to be oriented in a longitudinal direction, can be caused to be present in random directions. Consequently, the characteristics possessed by alumina, such as thermal conductivity, mechanical strength, etc., can be exhibited not only in the longitudinal direction but also in the thickness direction.

The alumina particles of the present invention have excellent fluidity as a powder based on the characteristic structure thereof, and can increase the discharge of supply devices used for mechanical conveyance, such as a hopper, a feeder, and the like, in application as industrial products. The alumina particles of the present invention have internal voids due to the characteristic structure, and thus the bulk specific gravity is not much different from plate-like alumina particles. However, the alumina particles of the present invention have high sphericity and, as described above, have high crushing strength and are hardly crushed as compared with the plate-like alumina particles, it is thus supposed that a high effect is given on the ease of conveyance due to the rolling of alumina particles.

The alumina particles used in the present invention have the card-house structure. The card-house structure is as described above, and the alumina particles are preferably alumina particles having the card-house structure in which flat plate-like alumina has a quadrangular plate-like shape and a plane portion and an end surface portion and the end surface portions come in contact with each other, and are more preferably alumina particles having the card-house structure in which flat plate-like alumina has a polygonal plate-like shape and a plane portion and an end surface portion and the end surface portions come in contact with each other.

[Crystal Form/α Crystallization Rate]

The alumina particles in the present invention are composed of aluminum oxide, and the crystal form is not particularly limited and may be, for example, transition alumina with various crystal forms such as $\gamma$, $\delta$, $\theta$, $\kappa$, etc., or may be transition alumina containing alumina hydrate. In view of more excellent mechanical strength and thermal conductivity, an α-crystal form is basically preferred.

In the present invention, the α crystallization rate of the alumina particles can be determined by XRD measurement. For example, a formed sample is placed and set in a holder for measurement samples by using a wide-angle X-ray diffractometer [Rint-Ultma] manufactured by Rigaku Corporation, and is measured under the conditions of Cu/Kα line, 40 kV/30 mA, a scanning speed of 1.0°/min, and a scanning range of 5° to 80°, then the α crystallization rate is determined from an intensity ratio of peak intensities. The α crystallization rate depends on firing conditions and the raw material used, and the alumina particles with high crushing strength and high fluidity have an α crystallization rate of 90% or more, more preferably 95% or more. The sample provided in measurement may be alumina particles or the flat plate-like alumina produced by disintegrating the card-house structure by some mechanical treatment.

[Average Particle Diameter]

In the present invention, the average particle diameter of the alumina particles having the fixed card-house structure formed of three or more flat plate-like alumina particles may be of any size within a range in which the structure can be formed, but in view of particularly excellent fluidity, the average particle diameter is preferably 3 µm or more and more preferably 10 µm or more. In addition, an excessively large size has a possibility of causing an appearance failure due to the exposure of the card-house structure in various applications such as a thermally conductive filler, a high-luminance pigment, and the like, and thus the average particle diameter is preferably 1000 µm or less and more preferably 300 µm or less.

[Maximum Particle Diameter]

In addition, the volume-based maximum particle diameter (in the present specification, may be simply described as the "maximum particle diameter" hereinafter) of the alumina particles having the fixed card-house structure formed of three or more flat plate-like alumina particles is not particularly limited, but is generally 3000 µm or less, preferably 1000 µm or less, and more preferably 500 µm or less.

When the maximum particle diameter of the alumina particles is larger than the upper limit described above, in the case of using by mixing with a solvent or a binder serving as a matrix, the alumina particles are likely to be projected from the surface of a binder layer, thereby undesirably causing an appearance failure depending on the form of final application. When the maximum particle diameter is smaller than the lower limit described above, in the case of mixing with a solvent or a binder, the performance originally possessed by alumina is undesirably likely to be unsatisfactorily exhibited due to an increase in the interfaces with the solvent or the matrix as compared with particles having a large particle diameter in the same mixing amount. For example, the effect of improving thermal conductivity in the thickness direction of a heat radiating sheet tends to become unsatisfactory or the interfacial surface between the matrix and the filler tends to be increased, thereby decreasing voltage endurance characteristics.

In addition, the average particle diameter and the maximum particle diameter described herein are values determined by a dry method of directly measuring, by using a laser diffraction particle size distribution analyzer, the alumina particles having the fixed card-house structure formed of three or more flat plate-like alumina particles.

The average particle diameter and the maximum particle diameter described above can also be supposed by a wet method of measuring, by using a laser diffraction/scattering particle size distribution analyzer, a sample prepared by dispersing in a proper solvent, specifically, dispersing the alumina particles in a pure water medium containing sodium hexametaphosphate or the like as a dispersion stabilizer.

[Aspect Ratio of Flat Plate-Like Alumina]

The flat plate-like alumina has a polygonal plate-like shape and preferably has an aspect ratio of 2 to 500, which is a ratio of the particle diameter to the thickness. The aspect ratio of 2 or more is preferred because it is advantageous for forming the card-house structure in a state of holding the performance characteristic of the flat plate-like alumina, and the aspect ratio of 500 or less is preferred because the average particle diameter of the alumina particles can be easily adjusted, and the occurrence of an appearance failure due to exposure of the card-house structure and a decrease in mechanical strength can be suppressed in various applications such as a thermally conductive filler, a high-luminance pigment, and the like. The aspect ratio is more preferably 5 to 300 and still more preferably 7 to 100. The aspect ratio of 7 to 100 is preferred in view of practicality because it is possible to produce the alumina particles having excellent thermal characteristics and optical characteristics such as luminance of the flat plate-like alumina and having the card-house structure with high fluidity.

In the present specification, the average value of the thicknesses measured for 10 particles by using a scanning electron microscope (SEM) is used as the thickness of the flat plate-like alumina.

In addition, the particle diameter of the flat plate-like alumina represents the arithmetic average value of the maximum lengths among the distances between two points on the outlines of plates, and a value obtained by measuring by using a scanning electron microscope (SEM) is used as the arithmetic average value.

The value of the average particle diameter represents a value obtained by calculation from the particle diameters measured for any 100 flat plate-like alumina particles from an image obtained by using a scanning electron microscope (SEM).

In addition, the method used for determining the average particle diameter of the flat plate-like alumina is, for example, a method of measuring the maximum length of flat plate-like alumina located at the center of the alumina particles. Alternatively, there may be used a method of measuring, with SEM, the maximum length of a single piece obtained by an air classification operation of alumina particles. There may be also used a method of measuring, with SEM, the maximum length of a single piece obtained by disintegrating the card-house structure by some mechanical treatment under conditions which do not break the flat plate-like alumina itself.

[Silicon Atom and/or Inorganic Silicon Compound]

The alumina particles having the fixed card-house structure formed of three or more flat plate-like alumina particles particularly preferably contain a silicon atom and/or inorganic silicon compound in the surfaces of the flat plate-like alumina. In particular, for example, in order that affinity for the binder is effectively improved in a smaller amount, a silicon atom and/or inorganic silicon compound is more preferably locally contained in the surfaces than being contained inside.

In the flat plate-like alumina containing the silicon atom and/or inorganic silicon compound, the degree of amount of the silicon atom and/or inorganic silicon compound unevenly distributed in the surfaces can be measured by, for example, analysis using an X-ray fluorescence spectrometer (XRF) and analysis using an X-ray photoelectron spectrometry (XPS).

In general, X-ray fluorescence (XRF) is a method of quantitatively analyzing the bulk composition of a material by detecting the X-ray fluorescence generated by X-ray irradiation and measuring the wavelength and intensity thereof. In addition, X-ray photoelectron spectrometry (XPS) is generally a method of analyzing the composition of constituent elements of a sample surface by X-ray irradiation of the sample surface and measuring the kinetic energy of photoelectrons emitted from the sample surface. Specifically, the uneven distribution of the silicon atom and/or inorganic silicon compound in and in the vicinities of the surfaces of the flat plate-like alumina can be considered to be supposed by determining whether or not [Si]/[Al]% (surface) determined by the results of XPS analysis shows a larger value than [Si]/[Al]% (bulk) determined by the results of XRF analysis of the product. This is because it means that the amount of silicon atom and/or inorganic silicon compound in the surfaces of the flat plate-like alumina produced by mixing the silicon atom and/or inorganic silicon compound is larger than the amount in the innermost portion of the flat plate-like alumina. In addition, the XRF analysis described above can be performed by using wavelength-dispersive type ZSX Primus IV manufactured by Rigaku Corporation or the like. The XPS analysis can be performed by using Quantera SXM manufactured by Ulvac Phi, Inc. or the like.

The alumina particles of the present invention may contain the silicon atom and/or inorganic silicon compound localized in the surfaces of the constituent flat plate-like alumina, and, for example, affinity for the binder can be more improved by the alumina particles composed of flat plate-like alumina having a ratio [Si]/[Al]% of 2.0 to 50.0%, which is the ratio of silicon concentration to aluminum concentration according to the XPS measurement.

When the flat plate-like alumina surfaces contain a large amount of the silicon atom and/or inorganic silicon compound, it is possible not only to more hydrophobilize the surface properties of alumina particles composed of the flat plate-like alumina as compared with when the silicon atom and/or inorganic silicon compound is not present, but also to improve affinity for an organic compound and various binders and matrixes when used as a filler. Further, the silicon atom and/or inorganic silicon compound present in the surfaces of the alumina particles serves as a reaction point and contributes to the reaction to various coupling agents such as an organic silane compound, thereby making it possible to easily adjust the surface conditions of alumina surfaces.

[Molybdenum]

In particular, the alumina particles having the fixed card-house structure formed of three or more flat plate-like alumina particles preferably contain molybdenum.

Molybdenum has a catalyst function and an optical function. Also, by using molybdenum, the alumina particles having excellent fluidity can be produced by a production method described later.

Examples of the molybdenum include, but are not particularly limited to, molybdenum metal, molybdenum oxide, partially-reduced molybdenum compounds, and the like.

The form in which molybdenum is contained is not particularly limited, and molybdenum may be contained in the form of adhering to the flat plate-like alumina surfaces of the alumna particles having the card-house structure, contained in the form of partially substituting aluminum of an alumina crystal structure, or contained in combination of both forms.

The content of molybdenum in the alumina particles of the present invention is preferably 10% by mass or less in terms of molybdenum trioxide, and by adjusting the firing temperature, the firing time, and flux conditions, the content is more preferably 0.001% to 8% by mass and still more preferably 0.01% to 5% by mass or less. The molybdenum content of 10% by mass or less is preferred because a single crystal quality of alumina is improved.

[Crushing Strength]

The alumina particles having the card-house structure preferably have higher crushing strength because the original fluidity is degraded when the card-house structure is broken by mechanical dispersion such as compression-shear or the like. The crushing strength depends on the crossing position, number, and area of the flat plate-like alumina particles, and the thickness and the aspect ratio of the flat plate-like alumina, and the required crushing strength varies according to various applications. In view of practicality, the crushing strength is preferably 1 to 100 MPa, more preferably 20 to 100 MPa, and still more preferably 50 to 100 MPa. The crushing strength of the alumina particles can be measured by using, for example, a small particle crushing strength analyzer NS-A100 manufactured by Nano Seeds Corporation, MCT-510 manufactured by Shimadzu Corporation, or the like. The crushing strength S [Pa] is an average value of 10 values calculated by the following formula wherein crushing force F {N} is a difference between a peak value during crushing and a baseline (the state without the force applied).

$$S = 2.8 \, F/(\pi \cdot D^2) \qquad \text{[Math. 1]}$$

In the formula, F is crushing force [N], and D is the particle diameter [m].

The inventors obtained knowledge that when the alumina particles having the fixed card-house structure formed of three or more flat plate-like alumina particles further contain the silicon atom and/or inorganic silicon compound, the crushing strength is higher than that of the alumina particles not containing the silicon atom and/or inorganic silicon compound. The crushing strength also varies with the content of the silicon atom and/or inorganic silicon compound, and the crushing strength of particles can be increased by increasing the content. In addition, for example, the crushing strength can be increased by using specific production conditions in the production method. The crushing strength can be arbitrarily adjusted by controlling the production conditions, and for example, the crushing strength of the alumina particles can be further increased by further increasing the firing temperature.

[Fluidity of Powder]

The alumina constituting a powder of the alumina particles of the present invention itself has a characteristic structure and a specified average particle diameter, and thus the powder has excellent fluidity as a powder as compared with plate-like alumina and twinned alumina particles. When all flat plate-like alumina particles constituting the alumina particles having the card-house structure of one unit are encircled so as to be included, in order to further increase the fluidity, the volume-based maximum encircling surface preferably has a spherical or substantially spherical shape. Also, if required, a lubricant or fine particle silica may be arbitrarily adhered for further improving the fluidity.

The fluidity as a powder of the alumina particles having the card-house structure can be determined by, for example, measurement of the angle of repose according to JIS R9301-2-2 or the like. The value of the angle of repose is preferably 50° or less and more preferably 40° or less because there hardly occur the problems such as hopper bridge and feed neck, nonuniform supply, a decrease in discharge amount, and the like during mechanical conveyance by a feeder, a hopper, etc.

The present invention relates to the alumina particles characterized by having the card-house structure formed of three or more flat plate-like alumina particles and having an average particle diameter of 3 to 1000 μm, but the alumina particles are more preferably have, as the fixed card-house structure, an internal structure in which the three or more flat plate-like alumina particles are aggregated to be crossed each other at two or more plurality of positions, and the plane directions of the flat plates crossed each other are in a state of disordered arrangement.

General known twinned alumina particles have a shape which has a structure with stand-out corners and which is more hardly rolled than the alumina particles of the present invention, and thus, originally, satisfactory fluidity as a filler (filler) cannot be obtained. Even if alumina particles have the same card-house structure as in the present invention, the significantly small average particle diameter causes poor fluidity, and there is no definite method for increasing the particle diameter. In any case, the adaptability for a filler (filler) is unsatisfactory. The excellent fluidity of the present invention is caused by the synergy effect of the card-house structure and the average particle diameter.

[Specific Surface Area]

The specific surface area of a powder of the alumina particles having the fixed card-house structure formed of three or more flat plate-like alumina particles is generally within a range of 50 to 0.001 $m^2/g$, preferably within a range of 10 $m^2/g$ to 0.01 $m^2/g$, and more preferably within a range of 5.0 $m^2/g$ to 0.05 $m^2/g$. Within the range described above, the card-house structure is formed by a proper number of flat plate-like alumina particles, and the function originally possessed by alumina is satisfactorily obtained, thereby causing excellent workability with no remarkable increase in viscosity during slurrying.

The specific surface area can be measured by JIS Z 8830: BET one-point method (adsorption gas: nitrogen) or the like.

[Void Ratio]

The alumina particles have the fixed card-house structure formed of three or more flat plate-like alumina particles and thus have voids in the alumina particles, and a shape with a low void ratio tends to easily become nonuniform and to be decreased in fluidity. Therefore, the void ratio is preferably 10% by volume or more and more preferably 30% by volume or more. In addition, the high void ratio decreases the crushing strength as a powder, and thus the void ratio is preferably 90% by volume or less and more preferably 70% by volume or less. The void ratio within the range described above causes a proper bulk specific density, no deterioration in the fluidity as the original object, and good handling properties. The void ratio can be determined by measurement such as a gas adsorption method, a mercury intrusion method, or the like according to JIS Z 8831 or the like.

The void ratio can be simply supposed by mixing the alumina particles with a liquid curable compound, such as an epoxy compound, a (meth)acrylic monomer, or the like, then curing the resultant mixture, and cutting-polishing, and SEM-observing a section.

<Method for Producing Alumina Particles>

The method for producing the alumina particles of the present invention is not limited as long as the particles have the card-house structure and preferably satisfy the physical properties described above. Details of the method for producing the alumina particles are described below by an example.

The average particle diameter, fluidity, specific surface area, mechanical strength, and void ratio of the alumina particles of the present invention, and the thickness and aspect ratio of the flat plate-like alumina, etc. can be adjusted by the production method described in detail later. For example, when a flux method is used as the production method, adjustment can be made by selecting the types of the molybdenum compound as a fluxing agent and the aluminum compound, the average particle diameter of the aluminum compound, the purity of the aluminum compound, the ratio of the silicon compound used, the type of the other shape controlling agent, the ratio of the other shape controlling agent used, the presence state of the silicon compound and the aluminum compound, and the presence state of the other shape controlling agent and the aluminum compound.

The alumina particles of the present invention may be produced based on any production method as long as the particles are allowed to have the fixed card-house structure formed of three or more flat plate-like alumina particles and have a specific average particle diameter. However, because of the multistage production process and poor productivity, it is undesirable to use alumina with the existing structure and to perform post-treatment to produce alumina having a characteristic structure such as the card-house structure and containing the silicon atom and/or inorganic silicon compound. For example, from the viewpoint of productivity, it is preferred to use a method for producing the alumina particles, which can selectively form the card-house structure as a structure from an existing alumina raw material, and which easily allows molybdenum to be contained in the structure and allows the silicon atom and/or inorganic silicon compound to be further contained therein, thereby simultaneously satisfying both.

That is, in view of higher aspect ratio of the flat plate-like alumina, more excellent fluidity and dispersibility of alumina particles, and more excellent productivity, the alumina particles of the present invention are more preferably produced by firing the aluminum compound in the presence of the molybdenum compound, silicon atom and/inorganic silicon compound, and the other shape controlling agent. When organic compounds are used as the molybdenum compound and the silicon compound, the organic components thereof are burnt down by firing. That is, the alumina particles can be more easily produced by reacting the molybdenum compound with the aluminum compound at high temperature to form aluminum molybdate, and then decomposing aluminum molybdate into alumina and molybdenum oxide at higher temperature to take molybdenum into the alumina particles. The molybdenum oxide is sublimated, but it can be recovered and reused. This production method is referred to as the "flux method" hereinafter. The flux method is described in detail later.

The silicon compound and the other shape controlling agent play an important role for plate-like crystal growth. In a general flux method using the molybdenum compound, molybdenum oxide selectively adsorbs on the [113] plane of alumina a crystal while the crystal components are hardly supplied to the [113] plane, and thus the appearance of the plane can be completely suppressed, thereby forming polygonal particles with a hexagonal bipyramidal shape as a base. The production method using the shape controlling agent can suppress the selective adsorption of molybdenum oxide as the fluxing agent on the [113] plane and thus can form a flat plate-like form having a dense hexagonal lattice crystal structure which is thermodynamically most stable and in which the [001] plane is developed. By using the molybdenum compound as the fluxing agent, the alumina particles composed of flat plate-like alumina having a high α crystallization rate, particularly an α crystallization rate of 90% or more, and containing molybdenum can be easily formed.

By utilizing the molybdenum compound, the alumina particles are allowed to have a high alumina a crystallization rate and a euhedral shape, and thus excellent dispersibility in a matrix, mechanical strength, and high thermal conductivity can be realized.

In addition, the alumina particles produced by the production method contain molybdenum and thus have excellent dispersibility because the zeta potential isoelectric point is shifted to the acid side as compared with usual alumina. Also, the alumina particles can be applied to use as an oxidation reaction catalyst and an optical material by using the characteristics of molybdenum contained in the alumina particles.

[Method for Producing Alumina Particles by Flux Method]

The method for producing the alumina particles is not particularly limited, but from the viewpoint that alumina having a high α crystallization rate at relatively low temperature can be preferably controlled, a production method by a flux method using a molybdenum compound can be preferably applied.

In more detail, a preferred method for producing the alumina particles includes a step of firing the aluminum compound in the presence of the molybdenum compound and the silicon compound and, if required, the shape controlling agent.

The inventors newly found that in the use of the production method using, in the flux method, the molybdenum compound as the fluxing agent and the silicon compound as the shape controlling agent in combination, which are then mixed with the aluminum compound and fired, the important factors for enabling the selective production of the alumina particles of the present invention include the size of raw material aluminum, the amount of the molybdenum compound used, and the amount of the silicon compound used.

(Aluminum Compound)

The aluminum compound in the present invention is a raw material of the alumina particles having the fixed card-house structure formed of three or more flat plate-like alumina particles and having a specific average particle diameter, and is not particularly limited as long as it is converted to alumina by heat treatment. Usable examples thereof include aluminum chloride, aluminum sulfate, basic aluminum acetate, aluminum hydroxide, boehmite, pseudo boehmite, transition alumina (γ-alumina, δ-alumina, θ-alumina, etc.), α-alumina, mixed alumina having two or more crystal phases, and the like.

In addition, the alumina compound may be composed of only an aluminum compound or a composite material of an aluminum compound and an organic compound. For example, an organic/inorganic composite material produced by modifying an aluminum compound with an organic silane compound, an aluminum compound composite material containing a polymer adsorbed thereon, or the like can also be preferably used. When such a composite material is used, the content of the organic compound is not particularly limited because the organic component is burnt down by firing, but from the viewpoint that the alumina particles having the card-house structure can be effectively produced, the content is preferably 60% by mass or less and more preferably 30% by mass or less.

The specific surface area of the aluminum compound is not particularly limited. In order to allow the molybdenum compound serving as the fluxing agent to effectively function, the larger specific surface area is preferred, but the raw material having any desired specific surface area can be used by adjusting the firing conditions and the amount of the molybdenum compound used.

The shape of the aluminum compound as the raw material is reflected in the aluminum particles of the present invention according to the fluxing method detailed below. Any one of a spherical shape, a formless shape, a structure with an aspect (such as a wire, a fiber, a ribbon, a tube, or the like), a sheet, and the like can be used, but in view of improving the fluidity of a powder, the spherical aluminum compound is preferably used because the resultant alumina particles come closer to be spherical.

In the method for producing the alumina particles from the aluminum compound in the present invention, the particle diameter of the aluminum compound used as the raw material is basically reflected in the average particle diameter of the alumina particles.

According to the fluxing method, in the firing step, the card-house structure is supposed to be formed by the crystal formation of flat plate-like alumina in the aluminum compound particles used as the raw material and proceeding and fixing of the crossing of three or more adjacent flat plate-like alumina particles. Thus, it is supposed that the average particle diameter of the raw material aluminum particles is reflected in the average particle diameter of the alumina particles having the resultant card-house structure.

Therefore, when the aluminum compound having a smaller average particle diameter is used as the raw material, the alumina particles having a smaller average particle diameter can be easily produced, while when the aluminum compound having a larger average particle diameter is used as the raw material, the alumina particles having a larger average particle diameter can be easily produced.

The alumina particles of the present invention are alumina particles having an average particle diameter of 3 to 1000 μm, and thus there may be used the aluminum compound corresponding to the alumina particles desired to be produced, which have the specific average particle diameter within the range, and having the same or substantially the same specific average particle diameter as the alumina particles.

The alumina particles having the card-house structure can be produced by, for example, the method for producing alumina particles including the step of firing the aluminum compound in the presence of the molybdenum compound and the silicon compound, and if required, the other shape controlling agent, wherein flat plate-like alumina is formed, and three or more flat plate-like alumina particles are formed and, at the same time, the crystal planes thereof are brought into contact and crossed each other at a plurality of positions and are fixed. The fixing creates a state wherein the card-house structure is fixed without being easily broken (disaggregated) by external stress such as pressure or the like. For example, the flux conditions or the like for forming the flat plate-like alumina influence the crushing strength of the alumina particles having the resultant card-house structure.

The smaller the amount of the molybdenum compound is, the more rapidly the three or more flat plate-like alumina particles are fixed in the particles of the aluminum compound, and the higher the frequency of fixing becomes. Thus, the strong card-house structure with higher crushing strength can be formed.

In the method for producing alumina particles by the flux method using the molybdenum compound as the fluxing agent and the silicon compound as the shape controlling agent in combination, mixing them with the aluminum compound, and then firing the resultant mixture, it is preferred 1) to use the aluminum compound raw material having a specific average particle diameter, 2) to limit the amount of the molybdenum compound used within a specific range, and 3) to limit the amount of the silicon compound used within a specific range. This is because it is possible to selectively produce the alumina particles having an average particle diameter within a specific range and having the fixed card-house structure formed of three or more flat plate-like alumina particles.

According to the knowledge of the present inventors with an attention paid to the flux method, specifically, for example, 1) when the aluminum compound having an average particle diameter of 2 µm or more, particularly 4 µm or more, corresponding to the particle diameter of the desired alumina particle, is used as the raw material aluminum compound, 2) when the amount of the molybdenum compound as the fluxing agent is 0.005 to 0.236 moles in terms of molybdenum metal in the molybdenum compound relative to 1 mole aluminum metal of the aluminum compound, and 3) when the amount of the silicon compound as the shape controlling agent is 0.003 to 0.09 moles in terms of silicon metal in the silicon compound relative to 1 mole aluminum metal of the aluminum compound, the alumina particles having higher fluidity and the card-house structure with higher crushing strength can be produced.

Also, the average particle diameter and shape of the alumina particles having the card-house structure can be arbitrarily adjusted by a crushing step and classification step described later.

(Molybdenum Compound)

As described later, the molybdenum compound has a flux function in alumina a crystal growth at relatively low temperature. Examples of the molybdenum compound include, but are not particularly limited to, molybdenum oxide and a compound containing acid radical anion ($MoO_x^{n-}$) formed by a bond between molybdenum metal and oxygen.

Examples of the compound containing acid radical anion ($MoO_x^{n-}$) include, but are not particularly limited to, molybdic acid, sodium molybdate, potassium molybdate, lithium molybdate, $H_3PMo_{12}O_{40}$, $H_3SiMo_{12}O_{40}$, $NH_4Mo_7O_{12}$, molybdenum disulfide, and the like.

The molybdenum compound can contain sodium or silicon, and in this case, the molybdenum compound containing sodium or silicon plays a role as both the fluxing agent and the shape controlling agent.

Among the molybdenum compounds, from the viewpoint of cost, molybdenum oxide is preferably used. The molybdenum compounds may be used alone or in combination of two or more.

The amount of molybdenum compound used is not particularly limited, but is preferably 0.005 to 0.236 moles, more preferably 0.007 to 0.09 moles, and still more preferably 0.01 to 0.04 moles in terms of molybdenum metal of the molybdenum compound relative to 1 mole of aluminum metal of the aluminum compound. The amount of molybdenum compound used within the range is preferred because the alumina particles having the card-house structure formed of the flat plate-like alumina having a high aspect ratio and excellent dispersibility can be produced. In addition, in the use of the flux method, when the molybdenum compound is used as the fluxing agent, what production method is used for producing unknown alumina particles can be specified on the evidence that alumina particles contain molybdenum.

(Silicon Compound)

The method for producing the alumina particles according to the present invention preferably further uses a silicon compound as the shape controlling agent in view of further improving fluidity etc. of the resultant alumina particles. The silicon compound plays an important role for crystal growth of flat plate-like alumina during firing of the aluminium compound in the presence of the molybdenum compound.

Silicon of the silicon compound selectively adsorbs on the [113] plane of an alumina a crystal and suppresses the selective adsorption of molybdenum oxide as the fluxing agent on the [113] plane, thereby enabling the formation of a flat plate shape having a dense hexagonal lattice crystal structure which is thermodynamically most stable and in which the [001] plane is developed. Thus, it is supposed that crystal formation on the [001] plane is more promoted with increases in the amount of silicon, and thus flat plate-like alumina with a small thickness can be produced.

In addition, when silicon is present in an amount sufficient to allow selective adsorption on the [113] plane of an alumina a crystal, selective adsorption of molybdenum oxide on the [113] plane is suppressed, thereby enabling the formation of a flat plate shape having a dense hexagonal lattice crystal structure which is thermodynamically most stable and in which the [001] plane is developed. Thus, it is supposed that with increases in the amount of silicon, the crossing positions of flat plate-like alumina, like other positions, have a dense hexagonal lattice crystal structure which is thermodynamically most stable, thereby causing strong fixing. That is, the crushing strength of the resultant alumina particles having the card-house structure is improved with increases in the silicon amount.

The type of the silicon compound is not particularly limited, and a known type can be used as long as it is not only a silicon atom but also a silicon compound. Specific examples thereof include metal silicon (silicon atoms), artificial synthetic silicon compounds such as an organic silane compound, a silicone resin, silica ($SiO_2$) fine particles, silica gel, mesoporous silica, SiC, mullite, and the like; natural silicon compounds such as bio-silica and the like; and the like. Among these, an organic silane compound, a silicone resin, and silica fine particles are preferably used from the viewpoint that a composite or mixture with the aluminum compound can be more uniformly formed. The above examples may be used alone or in combination of two or more.

When the silicon compound is an organic silicon compound, the organic component is burnt down by firing, and the resultant silicon atom or inorganic silicon compound is contained in the alumina particles. While when the silicon compound is an inorganic silicon compound, the silicon atom or inorganic silicon compound, not decomposed at a high temperature during firing, remains by firing, and is locally contained in the surfaces of flat plate-like alumina. From the above viewpoint, the silicon atom and/or inorganic silicon compound is preferably used because the silicon atom content can be increased by a smaller amount with the same molecular weight.

Preferably usable examples of the shape of the silicon compound include, but are not particularly limited to, a spherical shape, a formless shape, structures with an aspect (a wire, a fiber, a ribbon, a tube, and the like), a sheet, and the like.

The amount of the silicon compound used is not particularly limited, but is preferably an amount sufficient to allow selective adsorption on the [113] plane of an alumina a crystal, and the amount is preferably 0.003 to 0.09 moles, more preferably 0.005 to 0.04 moles, and still more preferably 0.007 to 0.03 moles in terms of silicon atom of the silicon compound relative to 1 mole of aluminum metal of the aluminum compound as the raw material. The amount of the silicon compound used within the range is preferred because the alumina particles having a high aspect of flat plate-like alumina and excellent dispersibility can be easily produced. An insufficient amount of the silicon compound cannot often sufficiently suppress adsorption of the molybdenum oxide as the fluxing agent on the [113] plane, thereby causing a tendency to produce nonuniform flat plate-like alumina having a small aspect ratio. Further, an insufficient amount of the silicon compound is not preferred because the resultant alumina particles easily become polygonal plate-like alumina not having the card-house structure of the present invention. Also, an excessively large amount of the silicon compound is not preferred because excessive silicon singly forms an oxide, and a different type of crystal other than alumina, such as $3Al_2O_3 \cdot 2SiO_2$ or the like, is contained.

In addition, as described above, the silicon compound may be arbitrarily added to the aluminum compound or may be contained as an impurity in the aluminum compound.

In the production method described above, a method for adding the silicon compound is not particularly limited, and a dry blend method of directly adding and mixing as a powder or a method of adding by mixing using a mixer or previously dispersing in a solvent, a monomer, or the like may be used.

The alumina particles in which the silicon atom and/or inorganic silicon compound is unevenly distributed in and in the vicinities of the surfaces of flat plate-like alumina and which has the card-house structure can be easily produced by passing through the step of firing the aluminum compound in the presence of the molybdenum compound and the silicon compound. According to the knowledge of the inventors, the use of the silicon compound during charging is an important factor for easily producing the card-house structure, and the presence of the silicon atom and/or inorganic silicon compound unevenly distributed in and in the vicinities of the surfaces of the alumina particles produced by firing becomes an important factor which brings about a large change in the surface shape of alumina originally lack of active points and maximizes the excellent characteristics of alumina in itself, and further which can impart a more excellent surface condition by integration with a surface treatment agent due to reaction with the active points as starting points.

(Shape Controlling Agent Other than Silicon Compound)

If required, in order to adjust fluidity and dispersibility, mechanical strength, the average particle diameter, and the aspect ratio etc. of flat plate-like alumina, the shape controlling agent other than the silicon compound may be used in the alumina particles having the card-house structure of the present invention so as not to inhibit the formation of the flat plate-like alumina by containing the silicon atom and/or inorganic silicon compound. Like the silicon compound, the shape controlling agent other than the silicon compound contributes to alumina plate-like crystal growth by firing the aluminium compound in the presence of the molybdenum compound.

The presence state of the shape controlling agent other than the silicon compound is not particularly limited as long as contact with the aluminum compound can be made. Preferably usable examples of the state include a physical mixture of the shape controlling agent and the aluminum compound, a composite material in which the shape controlling agent is uniformly or locally present in the surface or the inside of the aluminum compound, and the like.

The shape controlling agent other than the silicon compound may be arbitrarily added to the aluminum compound or may be contained as an impurity in the aluminum compound.

A method for adding the shape controlling agent other than the silicon compound is not particularly limited, and there may be used a dry blend method of directly adding and mixing as a powder or a method of adding by mixing using a mixer or previously dispersing in a solvent, a monomer, or the like.

Like the silicon compound, the type of the shape controlling agent other than the silicon compound is not particularly limited as long as the selective adsorption of the molybdenum oxide on the [113] plane of α-alumina can be suppressed during firing in the presence of the molybdenum compound at high temperature, and thus a plate-like shape can be formed. In view of the higher aspect ratio of flat plate-like alumina, more excellent fluidity and dispersibility of alumina particles, and more excellent productivity, a metal compound, excluding the molybdenum compound and the aluminum compound, is preferably used. Also, a sodium atom and/or sodium compound is more preferably used.

The sodium atom and/or sodium compound is not particularly limited, and a known one can be used. Specific examples thereof include sodium carbonate, sodium molybdate, sodium oxide, sodium sulfate, sodium hydroxide, sodium nitrate, sodium chloride, metal sodium, and the like. Among these, in view of industrially easy availability and easy handleability, sodium carbonate, sodium molybdate, sodium oxide, and sodium sulfate are preferably used. In addition, sodium or sodium atom-containing compounds may be used alone or in combination of two or more.

Preferably usable examples of the shape of the sodium atom ad/or sodium compound include, but are not particularly limited to, a spherical shape, a formless shape, structures with an aspect (a wire, a fiber, a ribbon, a tube, and the like), a sheet, and the like.

The amount of sodium atom and/or sodium compound used is not particularly limited, but is preferably 0.0001 to 2 moles and more preferably 0.001 to 1 mole in terms of sodium metal relative to 1 mole of aluminum metal of the aluminum compound. The amount of sodium atom and/or sodium compound used within the range is preferred because the alumina particles having a high aspect ratio and excellent dispersibility can be easily produced.

(Firing Step)

The firing step is preferably the step of firing the aluminum compound in the presence of the molybdenum compound and the silicon compound and, if required, the shape controlling agent other than the silicon compound.

The alumina particles of the present invention are produced by, for example, firing the aluminum compound in the presence of the molybdenum and the shape controlling agent. As described above, this production method is referred to as the "flux method". When the aluminum compound is fired in the presence of the molybdenum compound, the molybdenum compound reacts with the aluminum compound at high temperature to form aluminum molybdate, and then the aluminum molybdate is further decomposed into alumina and molybdenum oxide at higher temperature to grow alumina plate-like crystals in the presence of the shape controlling agent, thereby easily producing the alumina particles having the card-house structure of the present invention. Based on the flux method, the formation of the flat plate-like alumina and the formation of the card-house structure associated with fixing of three or more flat plate-like alumina particles are supposed to proceed in parallel.

Also, the alumina particles having the card-house structure of the present invention have an average particle diameter of 3 to 1000 µm, and thus the flat plate-like alumina constituting the particles preferably has, for example, a thickness of 0.01 to 5 µm, an average particle diameter of 0.1 to 500 µm, and an aspect ratio of 2 to 500, which is the ratio of particle diameter to thickness. In particular, when the alumina particles are used as a filler, in view of good usability, the flat plate-like alumina more preferably has a thickness of 0.03 to 3 µm, an average particle diameter of 0.5 to 100 µm, and an aspect ratio of 5 to 300, which is the ratio of particle diameter to thickness. The aspect ratio is still more preferably 7 to 200.

A firing method is not particularly limited, and a known common method can be used. At a firing temperature exceeding 700° C., the aluminum compound reacts with the molybdenum compound to form aluminum molybdate. Further, at a firing temperature of 900° C. or more, the aluminum molybdate is decomposed to form the flat plate-like alumina by the function of the silicon compound and the shape controlling agent. Also, when the aluminum molybdate is decomposed into alumina and molybdenum oxide, molybdenum is taken into aluminum oxide particles, producing the flat plate-shape alumina.

In addition, during firing, the states of the aluminum compound, the silicon compound, the shape controlling agent other than the silicon compound, and the molybdenum compound are not particularly limited as long as the molybdenum compound, the silicon compound, and the shape controlling agent other than the silicon compound are present near the aluminum compound in a degree which enables them to act on the aluminum compound. Specifically, powders of the molybdenum compound, the silicon compound, the shape controlling agent other than the silicon compound, and the aluminum compound may be simply mixed, may be mechanically mixed by using a grinder or the like, or may be mixed by using a mortar or the like, and mixing may be performed in either a dry state or a wet state.

The condition of the firing temperature is not particularly limited and properly determined according to the average particle diameter, fluidity, and dispersibility of the intended alumina particles of the present invention, and the aspect ratio etc. of the flat plate-like alumina. With respect to the firing temperature, in general, the maximum temperature may be 900° C. or more which is the decomposition temperature of aluminum molybdate ($Al_2(MoO_4)_3$).

In general, firing at a high temperature of 2000° C. or more being close to the melting point of α-alumina is required for controlling the shape of the α-alumina obtained after firing. However, in view of load on a firing furnace and fuel cost, there is a large problem for industrial use.

The preferred method for producing the alumina particles of the present invention described above can be performed at a temperature of as high as over 2000° C., but the alumina particles composed of the flat plate-like alumina having a high α crystallization rate and a high aspect ratio can be produced even at a temperature of as low as 1600° C. or less which is much lower than the melting point of a alumina.

According to the preferred production method described above, even under the condition of the maximum firing temperature of 900° C. to 1600° C., the alumina particles composed of the flat plate-like alumina having a high aspect ratio and an α crystallization rate of 90% or more can be simply and efficiently formed at low cost, and the maximum firing temperature is more preferably 920° C. to 1500° C. and most preferably within a range of 950° C. to 1400° C.

The higher the firing temperature is, the more improved the α crystallization at the crossing positions, like other positions, of the flat plate-like alumina is, and thus the alumina particles having the card-house structure with excellent mechanical strength can be produced.

With respect to the firing time, preferably, the time for temperature rise to the predetermined maximum temperature is within a range of 15 minutes to 10 hours, and the retention time at the maximum firing temperature is within a range of 5 minutes to 30 hours. In order to efficiently form the flat plate-like alumina, the firing retention time is more preferably about 10 minutes to 15 hours.

The longer the retention time at the maximum firing temperature is, the more improved the α crystallization at the crossing positions, like other positions, of the flat plate-like alumina is, and thus the alumina particles having the card-house structure with excellent crushing strength can be produced.

The firing atmosphere is not particularly limited as long as the effect of the present invention can be obtained, and, for example, an oxygen-containing atmosphere of air, oxygen, or the like and an inert atmosphere of nitrogen, argon, or the like are preferred, and an air atmosphere is more preferred in consideration of the cost aspect.

An apparatus for firing is not necessarily limited, and a so-called firing furnace can be used. The firing furnace is preferably constituted by a material which does not react with sublimated molybdenum oxide, and further, a firing furnace having high sealability is preferably used for efficiently utilizing the molybdenum oxide.

The preferred production method described above can selectively produce the alumina particles characterized by having the fixed card-house structure formed of three or more flat plate-like alumina particles and having an average particle diameter of 3 to 1000 µm, and can easily produce a powder containing the alumina particles at a content of 60% or more of the whole. In the production method, by selecting the more preferred conditions for production, it is possible to more easily produce a powder containing the alumina particles at a ratio of 80% or more of the whole, the alumina particles having the card-house structure in a state where the three or more flat plate-like alumina particles of the alumina particles are aggregated to be crossed at two or more plurality of positions and the plane directions of the flat plates crossed each other are disorderedly arranged.

[Molybdenum Removing Step]

The method for producing the alumina particles preferably includes, after the firing step, the molybdenum removing step of removing at least a portion of molybdenum according to demand.

As described above, firing is associated with sublimation of the molybdenum oxide, and thus the presence part and content of molybdenum contained in the alumina particles can be controlled by controlling the firing time, the firing temperature, etc.

Molybdenum can adhere to the surfaces of the alumina particles. Thus, unnecessary molybdenum on the alumina surfaces can be removed by washing with water, an aqueous ammonia solution, an aqueous sodium hydroxide solution, or an aqueous acid solution.

In this case, the molybdenum content can be controlled by properly changing the concentration and amount of water, aqueous ammonia solution, aqueous sodium hydroxide solution, and aqueous acid solution used, the washing portion, the washing time, and the like.

[Grinding Step]

The fired product may not satisfy the particle diameter range preferred in the present invention due to aggregation of the alumina particles. Therefore, if required, the alumina particles may be ground so as to satisfy the particle diameter range preferred in the present invention.

The method for grinding the fired product is not particularly limited, and a general known grinding method, such as a ball mill, a jaw crusher, a jet mill, a disc mill, SpectroMill, a binder, a mixer mill, or the like, can be applied.

[Classification Step]

In order to improve the fluidity of a powder by adjusting the average particle diameter or to suppress an increase in viscosity when the alumina particles are mixed with a binder for forming a matrix, classification treatment is preferably performed.

Classification may be a wet type or a dry type, but dry-type classification is preferred from the viewpoint of productivity. Examples of dry-type classification include classification with a sieve, air classification of classifying by a difference between centrifugal force and drag force, and the like. From the viewpoint of classification precise, wind classification is preferred, and a classifier, such as an air flow classifier using a Coanda effect, a swirling air flow classifier, a forced vortex centrifugal classifier, a semifree vortex centrifugal classifier, or the like, can be used.

The grinding step and classification step described above can be performed in a necessary stage including before and after a step of forming an organic compound layer described later. For example, the average particle diameter of the resultant alumina particles can be adjusted by selecting the presence of grinding and classification and the conditions therefor. The average particle diameter of the alumina particles has a close relation to the angle of repose, and thus even when the average particle diameter cannot be sufficiently adjusted only by the production method and production conditions of the alumina particles themselves described above, the average particle diameter of the alumina particles can be changed (the angle of repose is indirectly changed) by selecting the classification conditions or the like, thereby enabling to adjust the fluidity of the alumina particles.

Specifically, for example, when there is no alumina particles having the intended average particle diameter and the card-house structure, the alumina particles having a larger average particle diameter are classified, thereby producing the alumina particles having a smaller average particle diameter, having more excellent fluidity as compared with known alumina particles having the same average particle diameter, and having the card-house structure.

[Organic Compound Layer Forming Step]

In an embodiment, the method for producing the alumina particles described above may further include the step of forming an organic compound layer on the surfaces of the flat plate-like alumina. If required, the organic compound layer forming step is performed at a temperature causing no decomposition of the organic compound, generally, after the firing step or after the molybdenum removing step.

A method for forming the organic compound layer on the surfaces of the flat plate-like alumina of the alumina particles is not particularly limited, and a known method is properly applied. Examples thereof include a method of bringing a solution or dispersion containing the organic compound into contact with the alumina particles containing molybdenum and then drying, and the like.

The organic compound which can be used for forming the organic compound layer is, for example, an organic silane compound.

(Organic Silane Compound)

In the present invention, when the alumina particles having the card-house structure contain the silicon atom and/or inorganic silicon compound, the surface modifying effect described above can be expected as compared with the case not containing the silicon atom and/or inorganic silicon compound. Further, the reaction product of the alumina particles containing the silicon atom and/or inorganic silicon compound with an organic silane compound can also be used. In comparison with the alumina particles containing the silicon atom and/or inorganic silicon compound and having the card-house structure, the alumina particles including the reaction product with the organic silane compound and having the card-house structure are preferred because of better affinity for a matrix based on the reaction of the organic silane compound with the silicon atom and/or inorganic silicon compound localized in the surfaces of the flat plate-like alumina particles constituting the alumina particles.

Examples of the organic silane compound include alkyl trimethoxysilane or alkyl trichlorosilanes having an alkyl group with 1 to 22 carbon atoms, such as methyl trimethoxysilane, dimethyl dimethoxysilane, ethyl trimethoxysilane, ethyl triethoxysilane, n-propyl trimethoxysilane, n-propyl triethoxysilane, iso-propyl trimethoxysilane, iso-propyl triethoxysilane, pentyl trimethoxysilane, hexyl trimethoxysilane, and the like; 3,3,3-trifluoropropyl trimethoxysilane, tridecafluoro-1,1,2,2-tetrahydrooctyl) trichlorosilanes, phenyl trimethoxysilane, phenyl triethoxysilane, p-chloromethylphenyl trimethoxysilane, p-chloromethylphenyl triethoxysilanes, γ-glycidoxypropyl trimethoxysilane, γ-glycidoxypropyl triethoxysilane, epoxysilanes such as p-(3,4-epoxycyclohexyl)ethyl trimethoxysilane, and the like, amino silane such as γ-aminopropyl triethoxysilane, N-β(aminoethyl) γ-aminopropyl trimethoxysilane, N-β(aminoethyl) γ-aminopropylmethyl dimethoxysilane, γ-aminopropyl trimethoxysilane, γ-ureidopropyl triethoxysilane, and the like, mercaptosilane such as 3-mercaptopropyl trimethoxysilane and the like, vinyl silane such as p-styryl trimethoxysilane, vinyltrichlorosilane, vinyl tris(β-methoxyethoxy)silane, vinyl trimethoxysilane, vinyl triethoxysilane, γ-methacryloxypropyl trimethoxysilane, and the like, and epoxy-based, amino-base, or vinyl-based polymer type silane. These organic silane compounds may be contained alone or in combination of two or more.

The organic silane compound may be linked by covalent bond with at least a portion or entire of the silicon atom and/or inorganic silicon compound in the surfaces of the flat plate-like alumina of the alumina particles, and not only a portion of alumina but also the entire thereof may be coated with the reaction product. The method which can be used for providing to the alumina surfaces is adhesion by immersion or chemical vapor deposition (CVD).

The amount of the organic silane compound used is preferably 20% by mass or less and more preferably 10% to 0.01% by mass in terms of silicon atom relative to the mass of the silicon atom and/or inorganic silicon compound contained in the surfaces of flat plate-like alumina of the alumina particles. When the amount of the organic silane compound used is 20% by mass or less, the physical properties derived from the alumina particles can be preferably easily exhibited.

The alumina particles containing the silicon atoms and/or inorganic silicon compound can be reacted with the organic silane compound by a known common method for modifying a filler surface, and for example, a spray method using a fluid nozzle, stirring with a shear force, a dry method using a ball mill, a mixer, or the like, or an aqueous or organic solvent-based wet method can be used. Treatment using shear force is preferably performed so as not to crush the alumina particles used in the present invention.

The temperature in the system of the dry method or the drying temperature after treatment by the wet method is properly determined within a range not causing thermal decomposition according to the type of the organic silane compound. For example, in the case of treatment with the organic silane compound as described above, the temperature is preferably 80° C. to 150° C.

[Post-Processing Step]

For the alumina particles having the card-house structure, as long as the effect is not impaired, any desired step may be added during the production, or a posttreatment step may be added for arbitrarily adjusting the viscosity, the shape, etc. Examples thereof include a granulation step of rolling granulation, compression granulation, or the like, and granulation by a spray dry method using a binding agent as a binder, and granules can be easily produced by using a commercial apparatus.

EXAMPLES

Alumina particles and a production method therefor are described in detail below by examples, but the present invention is not limited to these examples. In addition, "%" represents "% by mass" unless otherwise specified.

[Measurement of Average Particle Diameter of Alumina Particles by Particle Size Distribution Measurement]

A volume-average value d50 was determined by measuring a formed sample using a laser diffraction-type dry particle size distribution meter (HELOS (H3355) & RODOS manufactured by Japan Laser Corporation).

[Analysis by X-Ray Diffraction (XRD) Method]

A formed sample was placed and set in a holder for measurement samples of a wide-angle X-ray diffractometer [Rint-Ultma manufactured by Rigaku Corporation] and measured under the conditions of Cu/Kα line, 40 kV/30 mA, a scanning speed of 1.0°/min, and a scanning range of 5° to 80°. Then, an α rate was determined from a peak intensity ratio.

[Measurement of Powder Fluidity]

The fluidity of a powder was evaluated by preparing 300 g of a sample and measuring the angle of repose by a method according to JIS R9301-2-2. The value was determined by rounding off to the first decimal place at the second decimal place. The angle of repose of 30.0° of less was evaluated as "very good", the angle of repose of 30.1° or more and 40.0° or less was evaluated as "good", the angle of repose of 40.1° or more and 50.0° or less was evaluated as "somewhat poor", and the angle of repose of 50.1° or more was evaluated as "poor".

[Measurement of Crushing Strength of Alumina Particles]

A prepared sample was used, and crushing force F {N}, which was a difference between a peak value during crushing and a baseline (the state without the force applied), was determined by using a small particle crushing force analyzer NS-A100 manufactured by Nano Seeds Corporation. The crushing strength S [Pa] was calculated by a formula below. The value was an average value of 10 particles. The value of 50 MPa or more was evaluated as "A", the value of 20 MPa or more and less than 50 MPa was evaluated as "B", the value of 1 MPa or more and less than 20 MPa was evaluated as "C", and the value of less than 1 MPa was evaluated as "D".

$$S = 52.8\, F/(\pi \cdot D^2) \quad \text{[Math. 2]}$$

In the formula, F is crushing force F {N}, and D is the particle diameter [m].

[Measurement of Bulk Density]

The bulk density (g/cm$^3$) of a sample was determined by a constant-volume measurement method in an environment at a temperature of 25° C. and a humidity of 50% using a method according to JIS R1628.

[Measurement of Specific Surface Area]

A prepared sample was measured by using TriStar 3000 manufactured by Micromeritics Instrument Corporation after pre-treatment under the conditions of 300° C. and 3 hours.

[Measurement of Density]

A prepared sample was measured, after pre-treatment under the conditions of 300° C. and 3 hours, at a measurement temperature of 25° C. with helium as a carrier gas by using dry-type automatic densitometer Accupyc II 1330 manufactured by Micromeritics Instrument Corporation.

[Evaluation of Void Ratio]

Mixed were 45% of prepared powder, 54.5% of (meth) acrylic monomer (KAYARAD DPEA-12 manufactured by Nippon Kayaku Co., Ltd., and 0.5% of a polymerization initiator (Perbutyl 0, manufactured by NOF Corporation), and then the resultant mixture was stirred, formed into a sheet having a thickness of 1 mm, and then cured under the conditions of 150° C. for 2 hours, forming a test piece. The test piece was cut, and the powder dispersion state of a section after polishing was observed by SEM. It was confirmed that the voids of the flat plate-like alumina constituting the alumina particles were in a state of being filled with (meth)acrylic resin (monomer cured product), and then 50 particles were arbitrarily selected. Then, the area occupied by alumina in the particles and the area of the (meth) acrylic resin contained in the alumina particles were determined by image analysis, and by using the values, the volume of each of the alumina and the resin was determined when regarded as a sphere. The ratio of the volume of the resin to the entire volume was considered as the void ratio of the alumina particles.

[Analysis of Shape of Alumina Particles by Scanning Electron Microscope]

A prepared sample was fixed on a sample support table by using a double-sided tape and observed with surface observation apparatus VE-9800 manufactured by Keyence Corporation.

[Analysis of Composition of Alumina Particles by X-Ray Fluorescence]

About 100 mg of prepared sample was placed on a filter, covered with a PP film, and then analyzed by using ZSX 100e manufactured by Rigaku Corporation.

[Analysis of Composition of Alumina Particles by X-Ray Photoelectron Spectrometry (XPS)]

A prepared sample was fixed by pressing on a double-sided tape and then analyzed by using Quantera SXM manufactured by ULVAC-PHI, Inc.

[Firing Method]

Firing was performed by using a firing furnace device with ceramic electrical furnace ARF-100K manufactured by Asahi Rika, Co., Ltd. and AMF-2P type temperature controller.

Example 1<Production of Alumina Particles Having Card-House Structure>

Mixed in a mortar were 146.15 g of aluminum hydroxide (manufactured by Nippon Light Metal Company, Ltd., average particle diameter: 9.4 μm), 0.95 g of silicon dioxide (manufactured by Kanto Chemical Co., Inc., special grade), and 5 g of molybdenum trioxide (manufactured by Taiyo Koko Co., Ltd.), preparing a mixture. The resultant mixture was placed in a crucible and then fired in the ceramic electrical furnace at 1100° C. for 10 hours. After lowering of the temperature, the crucible was taken out to produce 105.0 g of light blue powder. The resultant powder was crushed by a mortar until it passed through a 106-μm sieve.

Then, 100 g of the resultant light blue powder was dispersed in 150 mL of 0.5% ammonia water, and the resultant dispersed solution was stirred at room temperature (25° C. to 30° C.) for 0.5 hours and then filtered to remove ammonia water. Then, the residue was washed with water and dried to remove molybdenum remaining on particle surfaces, thereby producing 98 g of powder. Then, a fine particle component was removed by classification using an air flow classifier using Coanda effect (Hi-Plex classifier HPC-ZERO type manufactured by Powder Systems Co., Ltd.), producing 65 g of alumina particle powder. Also, measurement of the zeta potential indicated that the isoelectric point of the resultant alumina particles is pH 5.3.

Figure 3:
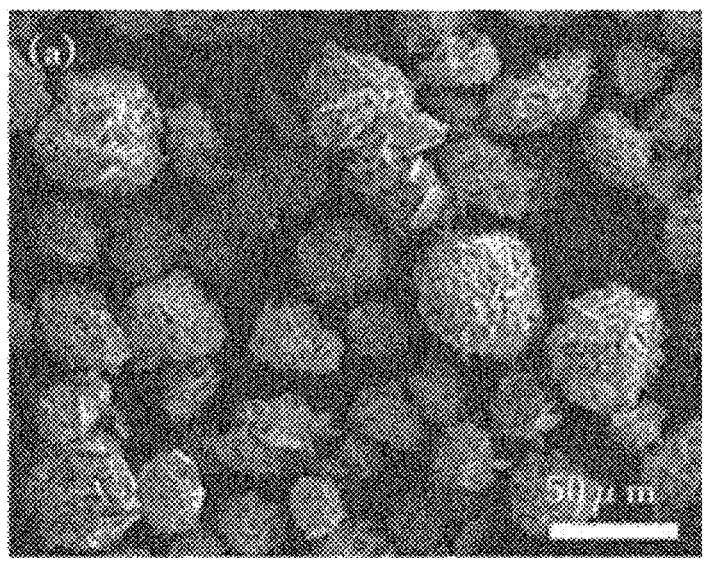
FIG. 3 is a scanning electron microscope photograph (a) of alumina particles of the present invention produced in Example 1.
Figure 4:
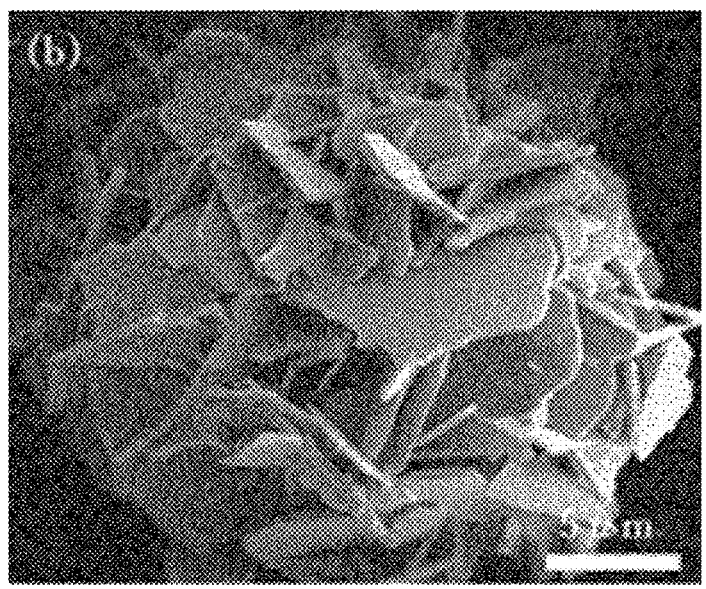
FIG. 4 is an enlarged scanning electron microscope photograph (b) of alumina particles of the present invention produced in Example 1.

SEM observation confirmed that the resultant powder is composed of alumina particles having a fixed card-house structure formed of three or more flat plate-like alumina particles (refer to FIG. 3 and FIG. 4). Measurement of the resultant powder showed an average particle diameter of 24.1 μm. It was also confirmed that the flat plate-like alumina itself constituting the card-house structure has a polygonal plate shape, a thickness of 400 nm, an average particle diameter of 8.9 μm, and an aspect ratio of 22. Further, as a result of XRD measurement, a sharp scattering peak derived from α-alumina appeared, and no peak of alumina crystal system other than the α crystal structure was observed. In addition, as a result of X-ray fluorescence quantitative analysis (XRF), the resultant particles contained 0.79% by mass of molybdenum in terms of molybdenum trioxide and the Si concentration [Si]/[Al]% to Al was 0.74%.

Also, as a result of analysis of the resultant powder by X-ray photoelectron spectrometry (XPS), the [Si]/[Al]% of the flat plate-like alumina of the alumina particles was 24.3% and was significantly higher than the value of [Si]/[Al]% of the bulk composition according to X-ray fluorescence quantitative analysis. This confirmed that silicon atoms and/or inorganic silicon compound is disorderly distributed on the surfaces of the flat plate-like alumina.

In addition, measurement of the resultant powder showed a density of 3.961 (g/cm$^3$).

In addition, measurement of the resultant powder showed a specific surface area of 1.337 (m$^2$/g).

Further, measurement of the resultant powder showed a bulk density of 0.50 (g/cm$^3$).

Further, as a result of calculation of crushing strength of the resultant powder by using a small particle crushing force analyzer NS-A100 manufactured by Nano Seeds Corporation, it was 27 MPa.

Further, a test piece was formed according to the measurement method for a void ratio described above. The test piece was cut, and the powder dispersion state of a section after polishing was observed by SEM. As a result, it was confirmed that the voids of the flat plate-like alumina constituting the alumina particles having the card-house structure are observed in a state of being filled with (meth)acrylic resin. The void ratio of the alumina particles was 67% by volume.

Example 2<Production of Alumina Particles>

The same experiment as in Example 1 was performed, except that aluminum hydroxide was changed to one (manufactured by Nippon Light Metal Company, Ltd., average particle diameter: 44.8 μm), producing 83 g of alumina particle powder. SEM observation confirmed that the resultant powder is composed of alumina particles having a card-house structure formed of a plurality of flat plate-like alumina particles. In addition, the results of X-ray fluorescence quantitative analysis (XRF) indicated that the resultant particles contain 0.77% by mass of molybdenum in terms of molybdenum trioxide and have a Si concentration [Si]/[Al]% of 0.71% relative to Al.

Also, as a result of analysis of the resultant powder by X-ray photoelectron spectrometry (XPS), the [Si]/[Al]% of the flat plate-like alumina surface composition of the alumina particles was 22.8% and was significantly higher than the value of [Si]/[Al]% of the bulk composition according to X-ray fluorescence quantitative analysis. It was thus confirmed that the silicon atom and/or inorganic silicon compound is disorderly distributed in the surfaces of the flat plate-like alumina.

Example 2 used as a raw material the alumina compound having a larger average particle diameter than in Example 1 and thus the resultant alumina particles were alumina particles having a larger average particle diameter, reflecting the size of the raw material.

Example 3<Production of Alumina Particles>

The same experiment as in Example 1 was performed to produce 65 g of alumina particle powder, which was then again passed through an air flow classifier to produce 9 g of alumina particle powder from a fine particle component. SEM observation confirmed that the resultant powder is composed of alumina particles having a card-house structure formed of a plurality of flat plate-like alumina particles. In addition, the results of X-ray fluorescence quantitative analysis indicated that the resultant particles contain 0.75% by mass of molybdenum in terms of molybdenum trioxide and have a Si concentration [Si]/[Al]% of 0.73% relative to Al.

Also, as a result of analysis of the resultant powder by X-ray photoelectron spectrometry (XPS), the [Si]/[Al]% of the flat plate-like alumina surface composition of the alumina particles was 23.9% and was significantly higher than the value of [Si]/[Al]% of the bulk composition according to X-ray fluorescence quantitative analysis. It was thus confirmed that silicon atoms and/or inorganic silicon compound is disorderly distributed on the surfaces of the flat plate-like alumina.

Example 3 attempted to produce the same alumina particles as in Example 1 but having a smaller average particle diameter based on the alumina particles produced in Example 1. The alumina particles having a small angle of repose and excellent fluidity can be produced by adjusting the classification conditions without impairing the crushing strength. It was found that in comparison between alumina particles having a smaller average particle diameter, the alumina particles of Example 3 have a smaller angle of repose than ordinary alumina particles, and thus have more excellent fluidity.

Example 4<Production of Alumina Particles>

The same experiment as in Example 1 was performed, except that 123.08 g of aluminum hydroxide (manufactured by Nippon Light Metal Company, Ltd., average particle diameter: 9.4 μm), 0.8 g of silicon dioxide (manufactured by Kanto Chemical Co., Inc., special grade), and 20 g of molybdenum trioxide (manufactured by Taiyo Koko Co., Ltd.) were mixed, producing 63 g alumina particle powder. SEM observation confirmed that the resultant powder is composed of alumina particles having a card-house structure formed of a plurality of flat plate-like alumina particles. In addition, the results of X-ray fluorescence quantitative analysis indicated that the resultant particles contain 0.92% by mass of molybdenum in terms of molybdenum trioxide and have a Si concentration [Si]/[Al]% of 0.78% relative to Al.

Also, as a result of analysis of the resultant powder by X-ray photoelectron spectrometry (XPS), the [Si]/[Al]% of the flat plate-like alumina surface composition of the alumina particles was 28.6% and was significantly higher than the value of [Si]/[Al]% of the bulk composition according to X-ray fluorescence quantitative analysis. It was thus confirmed that silicon atoms and/or inorganic silicon compound is disorderly distributed on the surfaces of the flat plate-like alumina.

Example 5<Production of Alumina Particles>

The same experiment as in Example 1 was performed, except that 146.15 g of aluminum hydroxide (manufactured by Nippon Light Metal Company, Ltd., average particle diameter: 9.4 μm), 0.48 g of silicon dioxide (manufactured by Kanto Chemical Co., Inc., special grade), and 5 g of molybdenum trioxide (manufactured by Taiyo Koko Co., Ltd.) were mixed, producing 73 g alumina particle powder. SEM observation confirmed that the resultant powder is composed of alumina particles having a card-house structure formed of a plurality of flat plate-like alumina particles. In addition, the results of X-ray fluorescence quantitative analysis indicated that the resultant particles contain 0.87% by mass of molybdenum in terms of molybdenum trioxide and have a Si concentration [Si]/[Al]% of 0.54% relative to Al.

Also, as a result of analysis of the resultant powder by X-ray photoelectron spectrometry (XPS), the [Si]/[Al]% of the flat plate-like alumina surface composition of the alumina particles was 22.3% and was significantly higher than the value of [Si]/[Al]% of the bulk composition according to X-ray fluorescence quantitative analysis. It was thus confirmed that silicon atoms and/or inorganic silicon compound is disorderly distributed on the surfaces of the flat plate-like alumina.

Example 6<Production of Alumina Particles>

The same experiment as in Example 1 was performed, except that 146.15 g of aluminum hydroxide (manufactured by Nippon Light Metal Company, Ltd., average particle diameter: 9.4 μm), 1.9 g of silicon dioxide (manufactured by Kanto Chemical Co., Inc., special grade), and 5 g of molybdenum trioxide (manufactured by Taiyo Koko Co., Ltd.) were mixed, producing 73 g alumina particle powder. SEM observation confirmed that the resultant powder is composed of alumina particles having a card-house structure formed of a plurality of flat plate-like alumina particles. In addition, the results of X-ray fluorescence quantitative analysis indicated that the resultant particles contain 0.60% by mass of molybdenum in terms of molybdenum trioxide and have a Si concentration [Si]/[Al]% of 0.10% relative to Al.

Also, as a result of analysis of the resultant powder by X-ray photoelectron spectrometry (XPS), the [Si]/[Al]% of the flat plate-like alumina surface composition of the alumina particles was 28.3% and was significantly higher than the value of [Si]/[Al]% of the bulk composition according to X-ray fluorescence quantitative analysis. It was thus confirmed that silicon atoms and/or inorganic silicon compound is disorderly distributed on the surfaces of the flat plate-like alumina.

Example 7<Production of Alumina Particles>

The same experiment as in Example 1 was performed, except that 146.15 g of aluminum hydroxide (manufactured by Nippon Light Metal Company, Ltd., average particle diameter: 9.4 μm), 4.75 g of silicon dioxide (manufactured by Kanto Chemical Co., Inc., special grade), and 5 g of molybdenum trioxide (manufactured by Taiyo Koko Co., Ltd.) were mixed, producing 76 g alumina particle powder. SEM observation confirmed that the resultant powder is composed of alumina particles having a card-house structure formed of a plurality of flat plate-like alumina particles. In addition, the results of X-ray fluorescence quantitative analysis indicated that the resultant particles contain 0.60% by mass of molybdenum in terms of molybdenum trioxide and have a Si concentration [Si]/[Al]% of 3.1% relative to Al.

Also, as a result of analysis of the resultant powder by X-ray photoelectron spectrometry (XPS), the [Si]/[Al]% of the flat plate-like alumina surface composition of the alumina particles was 28.5% and was significantly higher than the value of [Si]/[Al]% of the bulk composition according to X-ray fluorescence quantitative analysis. It was thus confirmed that silicon atoms and/or inorganic silicon compound is disorderly distributed on the surfaces of the flat plate-like alumina.

Example 8<Production of Alumina Particles>

The same experiment as in Example 1 was performed, except that the firing conditions were 1400° C. and 10 hours, producing 84 g alumina particle powder. SEM observation confirmed that the resultant powder is composed of alumina particles having a card-house structure formed of a plurality of flat plate-like alumina particles. In addition, the results of X-ray fluorescence quantitative analysis indicated that the resultant particles contain 0.55% by mass of molybdenum in terms of molybdenum trioxide and have a Si concentration [Si]/[Al]% of 0.61% relative to Al.

Also, as a result of analysis of the resultant powder by X-ray photoelectron spectrometry (XPS), the [Si]/[Al]% of the flat plate-like alumina surface composition of the alumina particles was 21.6% and was significantly higher than the value of [Si]/[Al]% of the bulk composition according to X-ray fluorescence quantitative analysis. It was thus confirmed that silicon atoms and/or inorganic silicon compound is disorderly distributed on the surfaces of the flat plate-like alumina.

In Example 8, the crushing strength of the resultant alumina particles could be increased by increasing the firing temperature in Example 1.

The alumina particle powder of any one of Examples 1 to 8 contained 85% or more of alumina particles relative to the whole of particles, the alumina particles having a fixed card-house structure formed of three or more flat plate-like alumina particles, the three or more flat plate-like alumina particles being aggregated to be crossed at two or more plurality of positions, and the directions of the planes crossed each other being in a state of disordered arrangement.

In addition, the number of the flat plate-like alumina particles constituting the alumina particles of each of Examples 1 to 8 was within a range of 15 to 1500 per alumina particle.

Comparative Example 1<Production of Plate-Like Alumina Particles>

Mixed in a mortar were 5 g of activated alumina (manufactured by Wako Pure Chemical Industries, Ltd., average particle diameter: 45 μm), 0.01 g of silica nanoparticles (KE-P10 manufactured by Nippon Shokubai Co., Inc., average particle diameter: 0.1 to 0.2 μm), and 5 g of molybdenum trioxide (manufactured by Wako Pure Chemical Industries, Ltd.), preparing 10.01 g of a mixture. The resultant mixture was placed in a crucible and then fired in the ceramic electrical furnace at 1100° C. for 10 hours. After lowering the temperature, the crucible was taken out to produce 5.1 g of blue powder.

SEM observation confirmed that the resultant powder has a polygonal shape, a thickness of 500 nm, an average particle diameter of 10 μm, and an aspect ratio of 20. Also, an aggregate of overlapped twinned particles or plural plates was not observed by SEM observation, and the particles were confirmed to have a plate-like shape. The amount of the fluxing agent was 0.35 moles in terms of molybdenum atom relative to 1 mole of aluminum metal in the aluminum compound, thereby failing to form the alumina particles having a card-house structure formed of three or more flat plate-like alumina particles and fixed, the three or more flat plate-like alumina particles being aggregated to be crossed at two or more plurality of positions, and the directions of the planes crossed each other being in a state of disordered arrangement.

Further, as a result of XRD measurement, a sharp scattering peak derived from α-alumina appeared, and a peak of an alumina crystal system other than the α crystal structure was not observed.

Then, 4 g of the resultant blue powder was dispersed in 4 mL of 10% ammonia water, and the resultant dispersed solution was stirred at room temperature (25° C. to 30° C.) for 3 hours and then filtered to remove ammonia water. Then, the residue was washed with water and dried to remove molybdenum remaining on particle surfaces, thereby producing 3.9 g of powder. As a result of X-ray fluorescence quantitative evaluation measurement of the resultant powder, it was confirmed that the amount of molybdenum in the powder is 0.84% in terms of molybdenum trioxide, and the alumina particles contain molybdenum.

Comparative Example 2

Commercial plate-like alumina particles Seraph 07070 (synthetic plate-like alumina manufactured by Kinsei Matec Co., Ltd.) were used and evaluated. SEM observation confirmed that the alumina particles are plate-like alumina particles having an average particle diameter of 5.3 μm and an average thickness of 400 nm, not alumina particles having a card-house structure formed of a plurality of flat plate-like alumina particles. Also, as a result of X-ray fluorescence quantitative analysis (XRF) and X-ray photoelectron spectrometry (XPS), molybdenum and Si were not detected.

The characteristics of the alumina particles of each of Examples 1 to 8 and Comparative Examples 1 and 2 are shown in tables below.

TABLE 1

| | | Unit | Example 1 | Example 2 | Example 3 | Example 4 |
|---|---|---|---|---|---|---|
| Charged composition | Average particle diameter of aluminum compound | μm | 9.4 | 44.8 | 9.4 | 9.4 |
| Mixing amount (g) | Aluminum compound | | | 146.15 | | 123.08 |
| | $MoO_3$ | | | 5 | | 20 |
| | $SiO_2$ | | | 0.95 | | 0.80 |
| Molar ratio | Mo/Al | | | 0.019 | | 0.089 |
| | Si/Al | | | 0.008 | | |
| Firing condition (temperature × 10 hours) | | | 1100° C. | | | |
| Flat plate-like alumina constituting alumina particle | Average particle diameter | μm | 8.9 | 7.6 | 8.8 | 9.1 |
| | Thickness | μm | 0.4 | 0.5 | 0.4 | 0.6 |
| | Aspect ratio | | 22 | 15 | 22 | 15 |
| Alumina particle having card-house structure | α rate | % | | 99 or more | | |
| | Average particle diameter | μm | 24.1 | 34.8 | 11.9 | 26.3 |
| | Angle of repose | ° | 37.0 | 34.3 | 46.4 | 35.5 |
| | Evaluation | | Good | Good | Good | Good |
| | Crushing strength Evaluation | | B | B | B | B |
| | Void ratio | % by volume | 67 | 62 | 72 | 60 |

TABLE 2

| | | Unit | Example 5 | Example 6 | Example 7 | Example 8 |
|---|---|---|---|---|---|---|
| Charged composition | Average particle diameter of aluminum compound | μm | | 9.4 | | |
| | Mixing amount (g) | Aluminum compound | | 146.15 | | |
| | | $MoO_3$ | | 5 | | |
| | | $SiO_2$ | 0.48 | 1.90 | 4.75 | 0.95 |
| | Molar ratio | Mo/Al | | 0.019 | | |
| | | Si/Al | 0.004 | 0.017 | 0.042 | 0.008 |
| Firing condition (temperature × 10 hours) | | | | 1100° C. | | 1400° C. |
| Flat plate-like alumina constituting alumina particle | Average particle diameter | μm | 6.8 | 7.5 | 6.7 | 9.0 |
| | Thickness | μm | 0.5 | 0.4 | 0.4 | 0.5 |
| | Aspect ratio | | 14 | 19 | 17 | 17 |
| Alumina particle having card-house structure | α rate | % | | 99 or more | | |
| | Average particle diameter | μm | 22.3 | 22.9 | 23.8 | 25.7 |
| | Angle of repose | ° | 39.2 | 39.4 | 38.0 | 36.5 |
| | Evaluation | | Good | Good | Good | Good |
| | Crushing strength Evaluation | | B | A | A | A |
| | Void ratio | % by volume | 68 | 64 | 66 | 56 |

TABLE 3

| | | Unit | Comparative Example 1 | Comparative Example 2 |
|---|---|---|---|---|
| Charged composition | Average particle diameter of aluminum compound | μm | 45 | Seraph 07070 |
| | Mixing amount (g) | Aluminum compound | 5 | |
| | | $MoO_3$ | 5 | |
| | | $SiO_2$ | 0.01 | |
| | Molar ratio | Mo/Al | 0.354 | |
| | | Si/Al | 0.002 | |
| Firing condition (temperature × 10 hours) | | | 1100° C. | — |
| Plate-like alumina particle | Average particle diameter | μm | 10.0 | 5.3 |
| | Thickness | μm | 0.5 | 0.4 |
| | Aspect ratio | | 20 | 13 |
| | α rate | % | 99 or more | |
| | Angle of repose | ° | 58.7 | 58.5 |
| | Evaluation | | Poor | Poor |
| | Crushing strength Evaluation | | — | — |
| | Void ratio | % by volume | — | — |

INDUSTRIAL APPLICABILITY

Alumina particles having a specific average particle diameter and a card-house structure according to the present invention have excellent fluidity, and thus excellent dispersibility and high filling properties can be expected, thereby permitting preferred use for a thermal conductive filler, a cosmetic material, a an abrasive material, a high-luminance pigment, a lubricant, a substrate of a conductive powder, a ceramic material, and the like.

What is claimed is:

1. Alumina particles having a fixed card-house structure formed of three or more flat plate-like alumina and having an average particle diameter of 3 to 1000 μm, wherein the three or more flat plate-like alumina are aggregated to be crossed each other at two or more plurality of positions, and plane directions of the flat plates crossed each other are in a state of disordered arrangement, and the alumina particles further contain a silicon atom and/or inorganic silicon compound, one flat plate-like alumina has a ratio [Si]/[Al]% of 2.0 to 50.0%, and an amount of the silicon atom and/or inorganic silicon compound in terms of silicon atom is 0.003 to 0.09 moles relative to 1 mole of aluminum metal of a raw material of the alumina particles.

2. The alumina particles according to claim 1, wherein the alumina particles are composed of alumina having an α crystallization rate of 90% or more.

3. The alumina particles according to claim 1, wherein the flat plate-like alumina has a polygonal plate-like shape and an aspect ratio of 2 to 500.

4. The alumina particles according to claim 1, wherein the angle of repose is 50° or less.

5. The alumina particles according to claim 1, wherein the crushing strength is 1 MPa to 100 MPa.

6. The alumina particles according to claim 1, wherein the void ratio inside the alumina particles is 10% to 90%.

7. The alumina particles according to claim 1, wherein a volume-based maximum encircling surface of a card-house structure of one unit has a spherical or substantially spherical shape.

* * * * *